(12) United States Patent
Li

(10) Patent No.: US 11,844,136 B2
(45) Date of Patent: Dec. 12, 2023

(54) DISCONTINUOUS RECEPTION (DRX) PARAMETER CONFIGURATION METHOD AND DEVICE

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 440 days.

(21) Appl. No.: 17/182,927

(22) Filed: Feb. 23, 2021

(65) Prior Publication Data
US 2021/0185762 A1 Jun. 17, 2021

Related U.S. Application Data

(63) Continuation of application No. PCT/CN2018/102308, filed on Aug. 24, 2018.

(51) Int. Cl.
H04W 76/28 (2018.01)
H04W 52/02 (2009.01)

(52) U.S. Cl.
CPC ....... *H04W 76/28* (2018.02); *H04W 52/0216* (2013.01); *H04W 52/0235* (2013.01)

(58) Field of Classification Search
CPC .............. H04W 56/005; H04W 56/00; H04W 72/1268; H04W 74/0833; H04W 74/0841;
(Continued)

(56) References Cited

U.S. PATENT DOCUMENTS

2008/0192703 A1* 8/2008 Suzuki ................. H04W 76/28
370/335
2011/0102157 A1* 5/2011 Tarkoma ........... H04W 52/0229
340/10.33
(Continued)

FOREIGN PATENT DOCUMENTS

CN 103596632 A 2/2014
CN 104205993 A 12/2014
(Continued)

OTHER PUBLICATIONS

ISA State Intellectual Property Office of the People's Republic of China, International Search Report Issued in Application No. PCT/CN2018/102308, dated May 23, 2019, WIPO, 4 pages.
(Continued)

*Primary Examiner* — Nathan S Taylor
(74) *Attorney, Agent, or Firm* — Finnegan, Henderson, Farabow, Garrett & Dunner, L.L.P

(57) ABSTRACT

A discontinuous reception (DRX) parameter configuration method includes: receiving a wake-up parameter associated with a wake-up message configured by a base station for a terminal, wherein the wake-up message is configured to instruct the terminal to detect whether the wake-up message is received within each DRX cycle; in response to that the wake-up message is detected within a current DRX cycle, entering a continuous active period at an end of the current DRX cycle; and when the continuous active period ends, entering a target DRX cycle according to the wake-up parameter, wherein the target DRX cycle is a first DRX cycle or a second DRX cycle, and a duration of the first DRX cycle is longer than a duration of the second DRX cycle.

15 Claims, 17 Drawing Sheets

(58) Field of Classification Search
CPC . H04W 74/0866; H04W 74/08; H04W 72/12; G01S 13/003; G01S 13/765; G01S 13/767; G01S 13/87; G01S 13/00; G01S 13/76; G01S 5/02; H04L 43/0864
See application file for complete search history.

(56) References Cited

U.S. PATENT DOCUMENTS

| | | | | |
|---|---|---|---|---|
| 2011/0128865 A1* | 6/2011 | Doppler | ............... | H04W 76/28 370/252 |
| 2012/0113904 A1* | 5/2012 | Anderson | ............ | H04W 76/28 370/329 |
| 2012/0113905 A1* | 5/2012 | Anderson | ............ | H04W 76/38 370/329 |
| 2012/0120815 A1* | 5/2012 | Anderson | ............ | H04W 76/28 370/252 |
| 2012/0120828 A1* | 5/2012 | Anderson | ......... | H04W 52/0251 370/252 |
| 2012/0120843 A1* | 5/2012 | Anderson | ......... | H04W 52/0232 370/253 |
| 2012/0127934 A1* | 5/2012 | Anderson | ............ | H04W 72/20 370/329 |
| 2012/0275366 A1* | 11/2012 | Anderson | ......... | H04W 52/0219 370/311 |
| 2013/0242828 A1* | 9/2013 | Sahu | ................ | H04W 52/0216 370/311 |
| 2014/0056197 A1* | 2/2014 | Deng | ............... | H04W 52/0225 370/311 |
| 2014/0189075 A1* | 7/2014 | Stansell | ................. | G06F 9/546 709/220 |
| 2014/0349646 A1 | 11/2014 | Su et al. | | |
| 2015/0071150 A1* | 3/2015 | Bradley | ............ | H04W 52/0216 370/311 |
| 2015/0189459 A1* | 7/2015 | Aon | ........................ | H04W 4/70 455/558 |
| 2016/0081025 A1 | 3/2016 | Deng | | |
| 2016/0366721 A1* | 12/2016 | Song | ....................... | H04W 4/06 |
| 2017/0367116 A1* | 12/2017 | Li | ....................... | H04W 74/004 |
| 2020/0092808 A1* | 3/2020 | Beale | .................... | H04W 28/04 |
| 2021/0014791 A1* | 1/2021 | Freda | ................ | H04W 52/0232 |

FOREIGN PATENT DOCUMENTS

| | | | |
|---|---|---|---|
| CN | 107197508 A | 9/2017 | |
| CN | 107743715 A | 2/2018 | |
| CN | 108184263 A | 6/2018 | |
| WO | WO-2012141642 A1 * | 10/2012 | ............ H04W 76/04 |
| WO | WO-2013066979 A1 * | 5/2013 | ........ H04W 52/0216 |
| WO | WO 2017/052596 A1 | 3/2017 | |
| WO | WO 2018/149348 A1 | 8/2018 | |

OTHER PUBLICATIONS

State Intellectual Property Office of the People's Republic of China, Office Action and Search Report Issued in Application No. 201880001859.0, dated May 6, 2021, 20 pages.

ISA State Intellectual Property Office of the People's Republic of China, Written Opinion of the International Searching Authority Issued in Application No. PCT/CN2018/102308, dated May 23, 2019, WIPO, 9 pages.

* cited by examiner

DISCONTINUOUS RECEPTION (DRX) PARAMETER CONFIGURATION METHOD AND DEVICE

CROSS-REFERENCE TO RELATED APPLICATIONS

This application is a continuation of International Application No. PCT/CN2018/102308 filed on Aug. 24, 2018, the disclosure of which is hereby incorporated by reference in its entirety.

TECHNICAL FIELD

The present disclosure relates to the field of communication, and in particular to discontinuous reception (DRX) parameter configuration methods and devices.

BACKGROUND

In related art, a packet-based data stream is usually bursty. If data transmission happens in a period of time, there may be no data transmission in a following long period of time. When there is no data transmission, power consumption can be reduced by stopping the reception of a physical downlink control channel (PDCCH), thereby increasing battery life. That is, a discontinuous reception (DRX) mechanism can be used.

In the DRX mechanism, a DRX cycle is configured for a terminal in a radio resource control (RRC) connected state. During an on duration (active) period of the DRX cycle, the terminal monitors and receives the PDCCH; and during an opportunity for DRX (sleep) period, the terminal does not receive the PDCCH so as to reduce the power consumption of the terminal, which is shown in FIG. 1.

In related art, a base station needs to send a scheduling message to control the terminal to enter a continuous active period for receiving data from the current DRX cycle. However, as the standardization relates to 5G, that is a new radio (NR) system, is ongoing under the 3rd generation partnership project (3GPP), the above process needs to be improved.

SUMMARY

According to a first aspect of embodiments of the present disclosure, there is provided a DRX parameter configuration method, which is applied to a terminal and including: receiving a wake-up parameter associated with a wake-up message configured by a base station for the terminal, wherein the wake-up message is configured to instruct the terminal to detect whether the wake-up message is received within each DRX cycle; in response to determining that the wake-up message is received within the current DRX cycle, entering a continuous active period at an end of the current DRX cycle; and when the continuous active period ends, entering a target DRX cycle according to the wake-up parameter, wherein the target DRX cycle is a first DRX cycle or a second DRX cycle, and a cycle duration of the first DRX cycle is longer than a cycle duration of the second DRX cycle.

According to a second aspect of embodiments of the present disclosure, there is provided a DRX parameter configuration method, which is applied to a base station and including: configuring a wake-up parameter associated with a wake-up message for a terminal; and sending the wake-up parameter to the terminal, wherein the wake-up message is configured to instruct the terminal to detect whether the wake-up message is received within each DRX cycle, and in response to determining that the wake-up message is received within a current DRX cycle, enter a continuous active period for continuously receiving data at an end of the current DRX cycle; and wherein the wake-up parameter is configured to instruct the terminal to enter a target DRX cycle when the continuous active period ends, the target DRX cycle is a first DRX cycle or a second DRX cycle, and a cycle duration of the first DRX cycle is longer than a cycle duration of the second DRX cycle.

According to a third aspect of the embodiments of the present disclosure, there is provided a non-transitory computer-readable storage medium having stored therein instructions that, when executed by a processor of a terminal, cause the terminal to perform the DRX parameter configuration method of the first aspect.

According to a fourth aspect of the embodiments of the present disclosure, there is provided a non-transitory computer-readable storage medium having stored therein instructions that, when executed by a processor of a base station, cause the base station to perform the DRX parameter configuration method of the second aspect.

According to a fifth aspect of embodiments of the present disclosure, there is provided a terminal, including: a processor; and a memory storing instructions executable by the processor, wherein the processor is configured to: receive a wake-up parameter associated with a wake-up message configured by a base station for the terminal, wherein the wake-up message is configured to instruct the terminal to detect whether the wake-up message is received within each DRX cycle; in response to determining that the wake-up message is received within the current DRX cycle, enter a continuous active period at an end of the current DRX cycle; and when the continuous active period ends, enter a target DRX cycle according to the wake-up parameter, wherein the target DRX cycle is a first DRX cycle or a second DRX cycle, and a cycle duration of the first DRX cycle is longer than a cycle duration of the second DRX cycle.

According to a sixth aspect of embodiments of the present disclosure, there is provided a base station, including: a processor; and a memory storing instructions executable by the processor, wherein the processor is configured to: configure a wake-up parameter associated with a wake-up message for a terminal; and sending the wake-up parameter to the terminal, wherein the wake-up message is configured to instruct the terminal to detect whether the wake-up message is received within each DRX cycle, and in response to determining that the wake-up message is received within a current DRX cycle, enter a continuous active period for continuously receiving data at an end of the current DRX cycle; and wherein the wake-up parameter is configured to instruct the terminal to enter a target DRX cycle when the continuous active period ends, the target DRX cycle is a first DRX cycle or a second DRX cycle, and a cycle duration of the first DRX cycle is longer than a cycle duration of the second DRX cycle.

It should be understood that the above general description and the following detailed description are only exemplary and explanatory, and are not restrictive of the present disclosure.

BRIEF DESCRIPTION OF THE DRAWINGS

The drawings herein are incorporated into the specification and constitute a part of the specification, show embodiments in accordance with the present disclosure, and together with the specification are used to explain the principle of the present disclosure.

DETAILED DESCRIPTION OF THE EMBODIMENTS

Exemplary embodiments will be described in detail below, and examples thereof are illustrated in the accompanying drawings. When the following description refers to the accompanying drawings, unless otherwise indicated, the same reference signs in different drawings represent the same or similar elements. The implementations described in the following exemplary embodiments do not represent all implementations consistent with the present disclosure. Rather, they are merely examples of devices and methods consistent with some aspects of the present disclosure as recited in the appended claims.

Terms used in the present disclosure are only for the purpose of describing exemplary embodiments, and are not intended to limit the present disclosure. For example, the terms "first," "second," "third," etc. may be used in the present disclosure to describe various information, the information should not be limited to these terms. These terms are only used to distinguish the same type of information from each other. For example, without departing from the scope of the present disclosure, first information may be referred to as second information and, similarly, second information may also be referred as first information. Also for example, depending on the context, the word "if" as used herein can be interpreted as "upon" or "when" or "in response to a determination".

Figure 1:
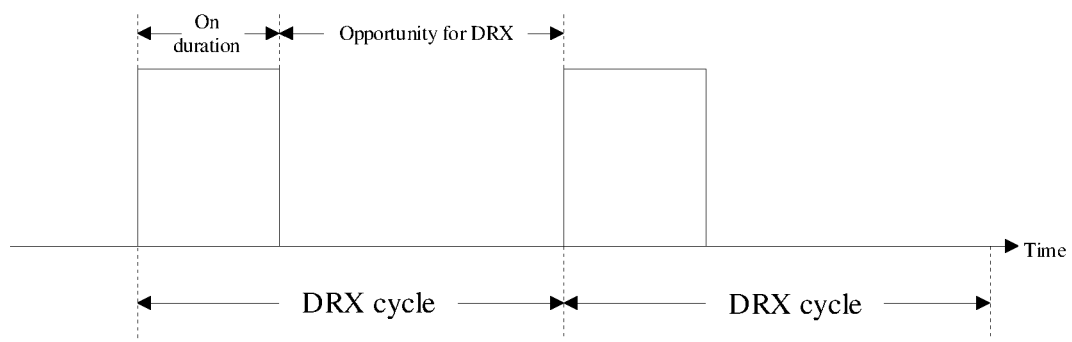
FIG. 1 is a schematic diagram illustrating a configuration scenario of a discontinuous reception (DRX) parameter in related art.
Figure 2:
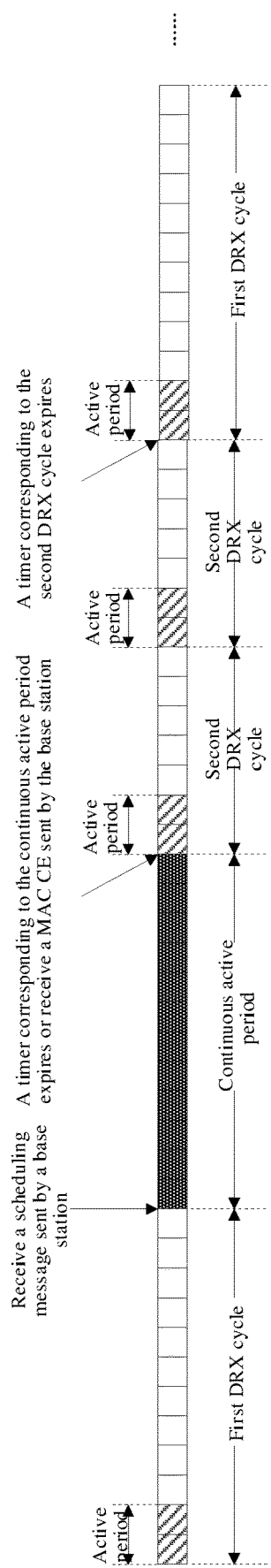
FIG. 2 is a schematic diagram illustrating a configuration scenario of a DRX parameter in related art.

FIG. 2 is a schematic diagram illustrating a configuration scenario of a discontinuous reception (DRX) parameter in related art. As shown in FIG. 2, when a terminal is in a first DRX cycle with a longer duration, the terminal monitors a PDCCH in an active period, e.g., an on duration period, and stops monitoring the PDCCH in a sleep period, e.g., an opportunity for DRX period. If the terminal receives a scheduling message sent by a base station during the active period of the first DRX cycle, the terminal may enter a continuous active period.

When the continuous active period ends, for example, a timer corresponding to the continuous active period expires or the terminal receives a media access control (MAC) control element (CE) sent by the base station, where the MAC CE instructs the terminal to stop receiving data. If the base station has previously configured the terminal with a second DRX cycle having a shorter period, the terminal enters the second DRX cycle; and if the second DRX cycle is not configured, the terminal enters the first DRX cycle.

After the terminal enters the second DRX cycle, the terminal starts a timer corresponding to the second DRX cycle configured by the base station for the terminal, and the terminal remains in the second DRX cycle during a validity period of the timer. When the timer expires, the terminal re-enters the first DRX cycle.

The above process in the related art does not involve a wake-up message. If the wake-up message is introduced, the DRX mechanism in the related art needs to be further improved.

Figure 3:
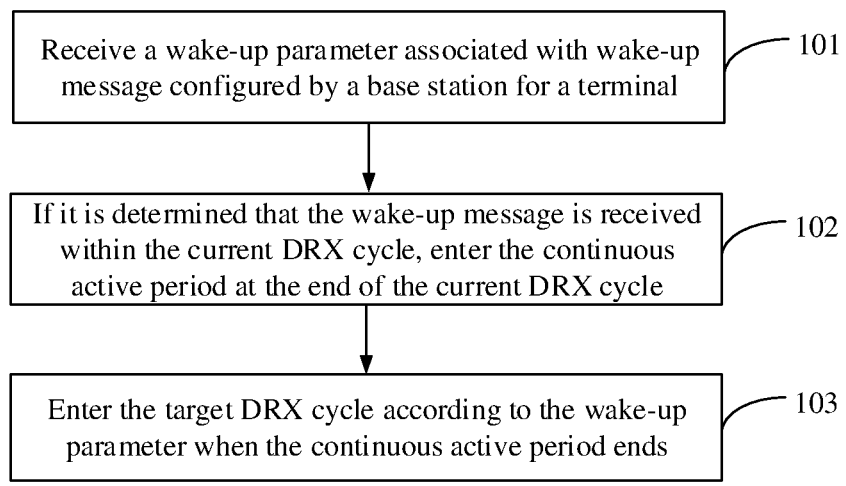
FIG. 3 is a flowchart illustrating a DRX parameter configuration method according to some embodiments.

Embodiments of the present disclosure provide a DRX parameter configuration method, which is applicable to a terminal. FIG. 3 is a flowchart illustrating a DRX parameter configuration method according to some embodiments. Referring to FIG. 3, the method can include the following steps.

At step 101, a wake-up parameter associated with a wake-up message configured by a base station for a terminal is received, where the wake-up message is configured to instruct the terminal to detect whether the wake-up message is received within each DRX cycle.

At step 102, if it is determined that the wake-up message is received within the current DRX cycle, a continuous active period is entered at an end of the current DRX cycle.

At step 103, a target DRX cycle is entered according to the wake-up parameter when the continuous active period ends, wherein the target DRX cycle is a first DRX cycle or a second DRX cycle, and a duration of the first DRX cycle is longer than a duration of the second DRX cycle.

In the embodiments, the terminal may receive a wake-up parameter associated with the wake-up message configured by the base station for the terminal. If the terminal determines that the wake-up message is received within the current DRX cycle, when the current DRX cycle ends, the terminal may enter the continuous active period. Further, the target DRX cycle can be entered according to the wake-up parameter when the continuous active period ends. In the embodiments, the wake-up message is used in the DRX mechanism, so that the terminal can respond faster when there is data to be transmitted, which can better save terminal resources and terminal power when there is no data to be transmitted.

In the step 101, the base station can configure the wake-up parameter associated with the wake-up message for the terminal. The wake-up message allows the terminal to detect whether the wake-up message is received within each DRX cycle, and the wake-up message is detected with the current DRX cycle. When the current DRX cycle ends, the terminal enters the continuous active period for continuously receiving data. In an embodiment, the wake-up message may be a wake-up channel or a wake-up signal.

For example, the base station may configure a wake-up channel for the terminal, and the transmission of the wake-up channel includes one or more wake-up message bits, and may also include one or more message bits for other purposes. The bits are processed according to a physical layer processing flow, such as encoding and modulating according to a specified encoding method. After the terminal receives the channel, the terminal performs a demodulation/decoding operation to obtain the wake-up message.

In another example, the wake-up message may be a wake-up signal. For example, the base station configures one or more sequence signals for the terminal at a designated resource location. The sequence signals may be pre-defined and regulated by a protocol, and the sequence signal has a predetermined characteristic, such as strong autocorrelation. After the signal is received, the terminal determines that it has received the wake-up signal.

In some embodiments, the wake-up parameter associated with the wake-up message may include a first wake-up parameter and a second wake-up parameter.

The first wake-up parameter may be configured to instruct the terminal to count a total number of wake-up messages received in a plurality of designated subframes. For example, the first wake-up parameter may be a timer parameter that counts the total number of received wake-up messages in a target number of consecutive subframes/symbols starting from an initial subframe/symbol. If the starting subframe is a subframe/symbol whose index is n and the target number is m, the multiple subframes/symbols include m subframes/symbols which are from subframe/symbol n to subframe/symbol (n+m−1), such that the terminal counts the total number of the received wake-up messages in the m subframes/symbols.

The second wake-up parameter may be configured to instruct the terminal to determine whether the total number is lower than a predetermined threshold. For example, the second wake-up parameter may be a counter parameter, and the terminal increase the total number of wake-up messages by one every time it receives a wake-up message within the m subframes/symbols between subframe/symbol n and subframe/symbol (n+m−1). At last, the terminal determines whether the total number of wake-up messages received in the m subframes/symbols is lower than predetermined threshold L.

After the base station configures the wake-up parameter for the terminal, the base station can send to the terminal the wake-up parameter, which can be directly received by the terminal according to related technologies.

In the above embodiments, the wake-up parameter may include a first wake-up parameter and a second wake-up parameter, where the first wake-up parameter may be configured to instruct the terminal to count a total number of wake-up messages received in multiple designated subframes; and the second wake-up parameter may be configured to instruct the terminal to determine whether the total number is lower than a predetermined threshold. In the embodiments, the first wake-up parameter may also be configured to instruct the terminal to count the total number of received wake-up messages in multiple designated symbols. The terminal can, according to the above two parameters, count the total number of received wake-up messages in multiple subframes/symbols at designated locations and determine whether the total number reaches a predetermined threshold, to determine whether the terminal needs to enter the first DRX cycle or the second DRX cycle when the continuous active period ends, thereby offering a high availability.

In the embodiments, the base station may also configure other DRX parameters for the terminal according to related technologies. For example, other DRX parameters can also be sent to the terminal according to related technologies, such as a cycle duration of the first DRX cycle, a cycle duration of the second DRX cycle, a timer corresponding to the second DRX cycle.

In the step 102, after the terminal receives the target DRX parameter, if the terminal determines that the wake-up message is received within the current DRX cycle, the terminal can enter the continuous active period for continuously receiving data according to the wake-up message.

In the embodiments, it can be detected that whether the wake-up message is received in a target subframe within the current DRX cycle, to determine whether the wake-up message is received within the current DRX cycle.

Figure 4:
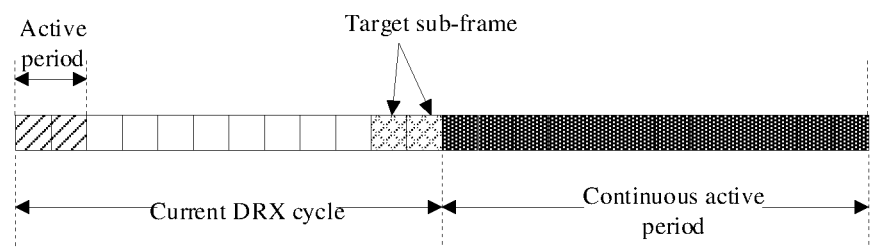
FIG. 4 is a schematic diagram illustrating a configuration scenario of a DRX parameter according to some embodiments.

For example, a location of a target resource may be a location of a resource that is at the end of the current DRX cycle, and is about to enter the next DRX cycle, as shown in FIG. 4. If the wake-up message is detected in the target subframe, when the current DRX cycle ends, the terminal can directly enter the continuous active period. The number of target subframes is one or more. A target subframe may be determined in the following manners.

In a first manner, the target resource is configured by the base station and a subframe corresponding to the target resource is used by the terminal as the target subframe. In this way, the base station can configure a target resource for the terminal through preset signaling, such as RRC signaling. The target resource can be a time-frequency resource. The terminal uses the subframe corresponding to the target resource as the target subframe according to the target resource configured by the base station.

In a second manner, the target subframe is determined according to a pre-configuration.

In some embodiments, the target resource corresponding to the target subframe may be written into the protocol in advance. The terminal determines the target resource according to the pre-configuration in the underlying protocol, and uses the subframe corresponding to the target resource as the target subframe.

In some embodiments, the involved subframes can also be replaced with symbols, which are not limited in the present disclosure.

In the above embodiments, if the terminal receives the wake-up message at the location of the target subframe in the current DRX cycle, it determines that the wake-up message is received within the current DRX cycle. In some embodiments, the base station may configure the target resource for the terminal through preset signaling, and the terminal uses the subframe indicated by the target resource as the target subframe. The target subframe can also be determined according to the pre-configuration on the terminal. Through the above process, the terminal only needs to monitor whether the wake-up message is received on the target subframe in the current DRX cycle, which further saves terminal resources and terminal power. When the wake-up message is received, the terminal can enter the continuous active period in a timely manner to continuously receive data.

In the step 103, the terminal may enter the target DRX cycle when the continuous active period ends. The target DRX cycle may be the first DRX cycle or the second DRX cycle, where the duration of the first DRX cycle is longer than that of the second DRX cycle. In some embodiments, a cycle duration of the first DRX cycle may be multiple times a cycle duration of the second DRX cycle.

In the embodiments, the terminal may determine that the continuous active period is ended when a preset timer corresponding to the continuous active period expires, or when receiving, from the base station, a MAC CE instructing the terminal to stop receiving data.

If it is determined that the total number of the wake-up message received by the terminal in multiple subframes at the designated locations is lower than the threshold according to the wake-up parameter, it means that the terminal has received fewer wake-up messages and the terminal may not need to perform a data transmission in a longer period of time. Therefore, the terminal may enter the first DRX cycle with a longer duration when the continuous active period ends.

If it is determined that the total number of the wake-up message received by the terminal in a plurality of subframes at the designated location reaches or exceeds the threshold according to the wake-up parameters, it means that the terminal has received more wake-up messages, and the terminal may need to perform the data transmission again in a short period of time. Therefore, the terminal may enter the second DRX cycle with a shorter period when the continuous active period ends.

In some embodiments, the involved subframes can also be replaced with symbols, which are not limited in the present disclosure.

In the above embodiments, if the total number of wake-up messages received by the terminal is lower than the threshold, the terminal may enter the first DRX cycle with a longer duration when the continuous active period ends; and if the total number of wake-up messages received by the terminal reaches or exceeds the threshold, the terminal may enter the second DRX cycle with a shorter duration when the continuous active period ends. Through the above process, when the terminal receives fewer wake-up messages, it can enter the first DRX cycle with a longer duration, thereby saving terminal power and terminal resources; and when the terminal receives more wake-up messages, it can enter the second DRX cycle with a shorter duration, so that the terminal can respond in a timely manner when there is data to be transmitted.

Figure 5:
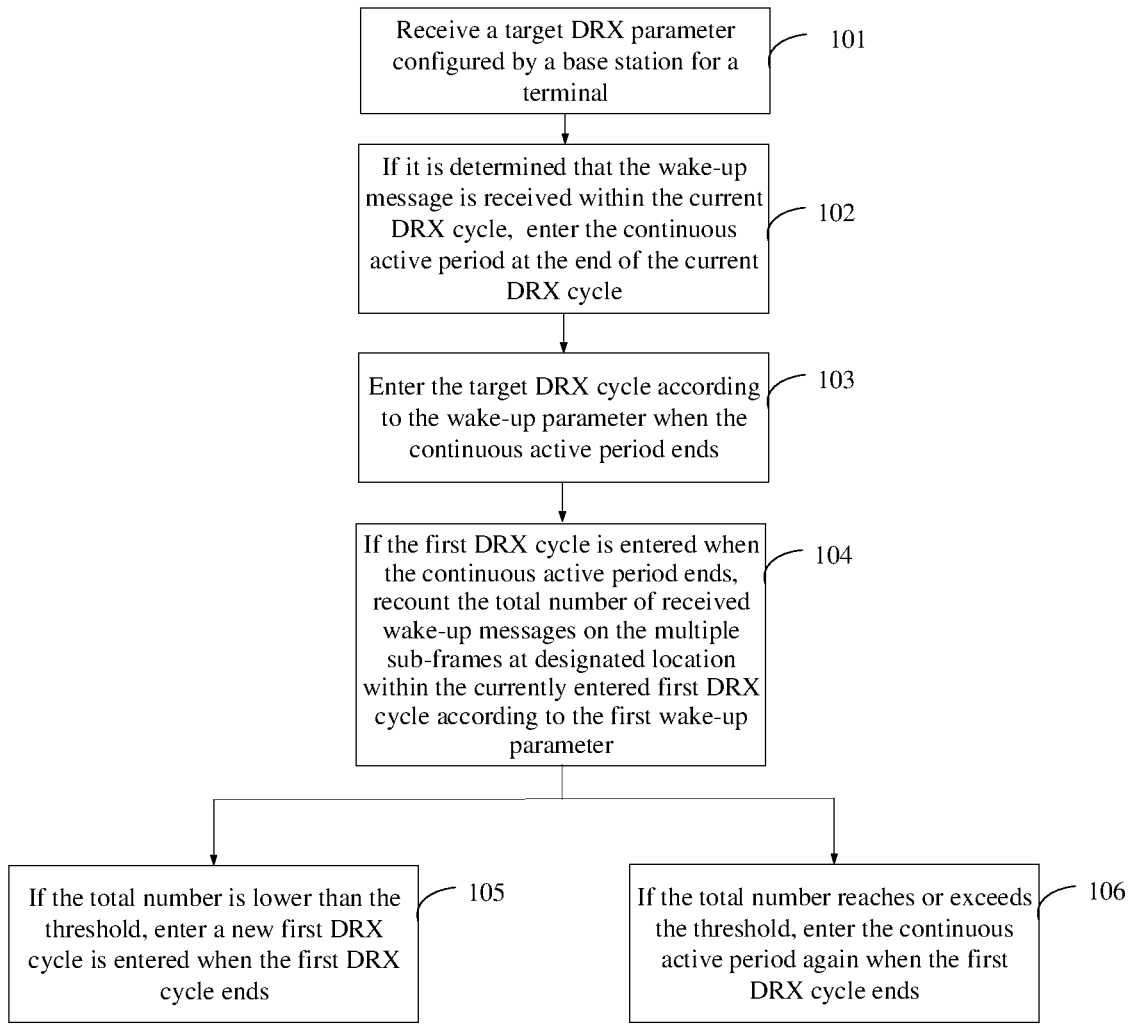
FIG. 5 is a flowchart illustrating a DRX parameter configuration method according to some embodiments.

FIG. 5 is a flowchart of a DRX parameter configuration method according to an embodiment. As shown in FIG. 5, in addition to the steps 101-103 illustrated in FIG. 3, the method may further include the following steps.

At step 104, if the first DRX cycle is entered when the continuous active period ends, a total number of received wake-up messages in the multiple subframes at designated locations within a currently entered first DRX cycle is recounted according to the first wake-up parameter.

In this step, if the terminal enters the first DRX cycle with a longer duration when the continuous active period ends, to respond in a timely manner when there is data to be transmitted, the terminal can recount the total number of the received wake-up messages in the multiple subframes at the designated locations within the currently entered first DRX cycle according to the first wake-up parameter.

In some embodiments, the involved subframes can also be replaced with symbols, which are not limited in the present disclosure.

At step 105, if the total number is lower than the threshold, a new first DRX cycle is entered when the first DRX cycle ends.

At this step, if the total number of wake-up messages received within the first DRX cycle is relatively small and is lower than the threshold, the terminal may enter a new first DRX cycle with a longer duration when the first DRX cycle ends.

For example, the threshold value is 1, and the terminal does not receive the wake-up message in the first DRX cycle, that is, the total number of the wake-up message is 0, which is lower than the threshold, and the terminal can enter a new first DRX cycle with a longer duration when the current first DRX cycle ends.

At step 106, if the total number reaches or exceeds the threshold, the continuous active period is entered again when the first DRX cycle ends.

At this step, if the total number reaches or exceeds the threshold, the terminal may enter the continuous activation period again when the current first DRX cycle ends.

For example, the threshold value is 1, and the terminal receives the wake-up messages in the first DRX cycle, and the total number of wake-up messages is also 1. When the threshold is reached, the terminal may re-enter the continuous active period for continuously receiving data when the current first DRX cycle ends.

In the above embodiments, if the terminal enters the first DRX cycle with a longer duration when the continuous active period ends, the terminal can recount the total number of received wake-up messages on the multiple subframes at designated location within the currently entered first DRX cycle according to the first wake-up parameter. In this way, the terminal may enter the first DRX cycle with a long duration, if the total number of wake-up messages received is lower than the preset threshold, the terminal can re-enter a new first DRX cycle when the first DRX cycle ends. If the total number of wake-up messages received reaches or exceeds the threshold, the terminal can quickly enter the continuous active period and receive data in a timely manner.

Figure 6:
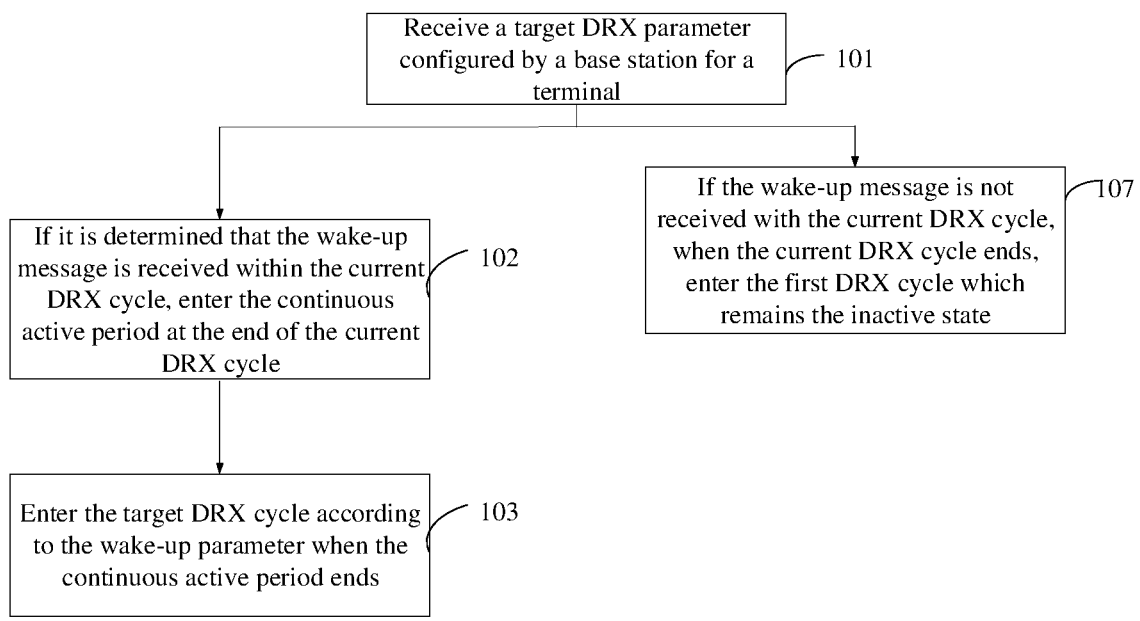
FIG. 6 is a flowchart illustrating a DRX parameter configuration method according to some embodiments.

FIG. 6 is a flowchart of a DRX parameter configuration method according to an embodiment. As shown in FIG. 6, in addition to the steps 101-103 illustrated in FIG. 3, the method may further include the following step.

At step 107, if no wake-up message is detected within the current DRX cycle, when the current DRX cycle ends, the first DRX cycle which remains a sleep state is entered, and the sleep state is a state in which the terminal does not monitor the PDCCH.

In this step, if the wake-up message is not detected within the current DRX cycle, at the end of the current DRX cycle, the terminal can enter the first DRX cycle in which the sleep state is always kept, and the sleep state is a state in which the terminal does not monitor the PDCCH.

That is, the terminal does not receive the wake-up message in the current DRX cycle, indicating that the terminal may not need to perform data transmission for a relatively long period of time. After the terminal enters the first DRX cycle, even if it is in the active period of the first DRX cycle, PDCCH blind detection may not be performed, thereby saving terminal resources and terminal power.

In the above embodiments, if the terminal does not receive the wake-up message in the current DRX cycle, when the current DRX cycle ends, the terminal can enter the first DRX cycle which remains the sleep state is, and the sleep state is a state in which the terminal does not monitor a state of the PDCCH. Through the above process, when the terminal does not receive the wake-up message in the current DRX cycle, it enters the first DRX cycle with a longer cycle duration, and puts itself in a long sleep state without PDCCH monitoring, thereby saving better terminal resources and terminal power.

Figure 7:
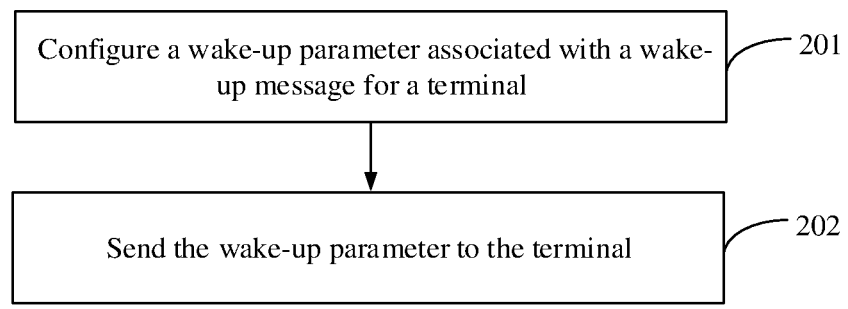
FIG. 7 is a flowchart illustrating a DRX parameter configuration method according to some embodiments.

Embodiments of the present disclosure also provide a configuration method for discontinuous reception of DRX parameters, which is applicable to a base station. FIG. 7 is a flowchart illustrating a DRX parameter configuration method according to some embodiments.

At step 201, a wake-up parameter associated with a wake-up message is configured for a terminal;

At step 202, the wake-up parameter is sent to the terminal.

The wake-up message is configured to instruct the terminal to detect whether the wake-up message is received within each DRX cycle, and if it is determined that the wake-up message is received within a current DRX cycle, a continuous active period for continuously receiving data is entered at the end of the current DRX cycle.

The wake-up parameter is configured to instruct the terminal to enter a target DRX cycle when the continuous activation period ends. The target DRX cycle is a first DRX cycle or a second DRX cycle, and the duration of the first DRX cycle is longer than the duration of the second DRX cycle.

In the above embodiments, a wake-up parameter associated with a wake-up message may be configured by a base station for a terminal and the wake-up parameter may be sent to the terminal. The terminal detects whether the wake-up parameter is received within each DRX cycle, if the wake-up parameter is received within the current cycle, enters the continuous active period when the DRX cycle ends. Further, the terminal may enter the target DRX cycle when the continuous active period ends. In the above embodiment, the wake-up message is used in the DRX mechanism, and a wake-up parameter associated with the wake-up message is configured by the base station for the terminal, so that the terminal can respond faster when there is data to be transmitted, which can better save terminal resources and terminal power when there is no data to be transmitted.

In the step 201, the base station can configure the wake-up parameter associated with the wake-up message for the terminal. The wake-up message allows the terminal to detect whether the wake-up message is received within each DRX cycle, and if it is determined that the wake-up message is received within the current DRX cycle, when the current DRX cycle ends, the terminal enters the continuous active period for continuously receiving data. In an embodiment, the wake-up message may be a wake-up channel or a wake-up signal.

In some embodiments, the wakeup parameter associated with the wakeup message may include a first wake-up parameter and a second wake-up parameter.

The first wake-up parameter may be configured to instruct the terminal to count a total number of wake-up messages received in a plurality of designated subframes. For example, the first wake-up parameter may be a timer parameter that counts the total number of received wake-up messages in a target number of consecutive subframes/symbols starting from an initial subframe/symbol. If the starting subframe is a subframe/symbol whose index is n and the target number is m, a plurality of subframes/symbols include m subframes/symbols which are from subframe/symbol n to subframe/symbol (n+m−1), such that the terminal counts the total number of the received wake-up messages in the m subframes/symbols.

The second wake-up parameter may be configured to instruct the terminal to determine whether the total number is lower than a predetermined threshold. For example, the second wake-up parameter may be a counter parameter, and the terminal increase the total number of wake-up messages by one every time it receives a wake-up message within the m subframes/symbols between subframe/symbol n and subframe/symbol (n+m−1). At last, the terminal determines whether the total number of wake-up messages received in the m subframes/symbols is lower than predetermined threshold L.

In the step 202, the base station may send the configured wake-up parameter to the terminal through related technologies. In some embodiments, the base station may send the wake-up parameter to the terminal through a preset signaling, such as send the wake-up parameter through RRC signaling, or send the wake-up parameter through MAC CE. The present disclosure does not limit the sending method.

After receiving the wake-up parameters, the terminal side may detect whether a wake-up message is received within each DRX cycle. If it is determined that the wake-up message is received within the current DRX cycle, when the current DRX cycle ends, the terminal may enter continuous active period. Further, when the continuous active period ends, it needs to enter the target DRX cycle according to the wake-up parameter, that is, enter the first DRX cycle with a longer duration or the second DRX cycle with a shorter duration.

It should be noted that the subframes involved in the present disclosure can also be replaced with symbols, which are not limited in the present disclosure.

Figure 8:
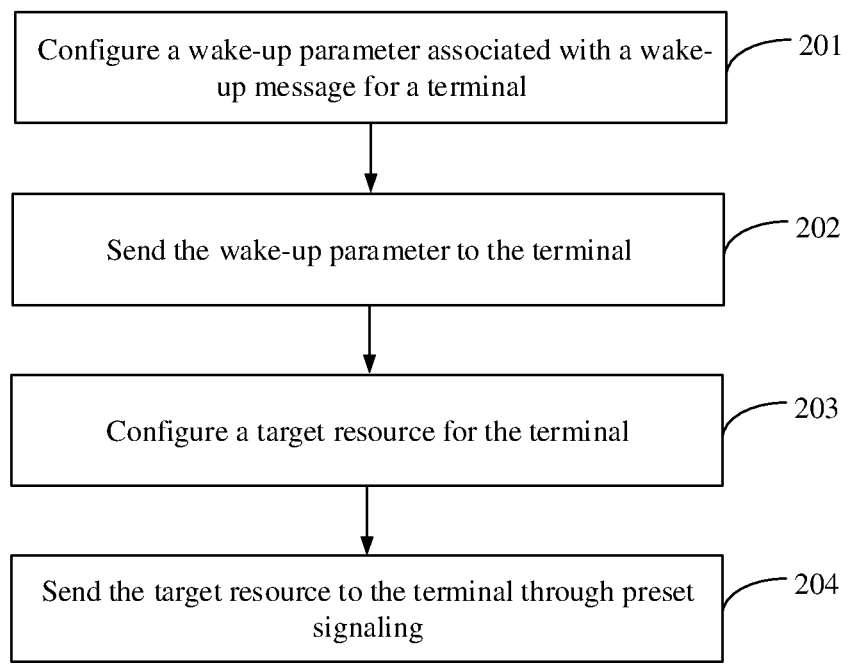
FIG. 8 is a flowchart illustrating a DRX parameter configuration method according to some embodiments.

FIG. 8 is a flowchart of a DRX parameter configuration method according to some embodiments. As shown in FIG. 8, in addition to the steps 201 and 202 illustrated in FIG. 7, the method may further include the following steps.

At step 203, a target resource is configured for the terminal; the target resource is a resource corresponding to a target subframe, and the target subframe is a subframe for the terminal to detect whether the wake-up message is received within each DRX cycle.

In this step, a location of the target resource may be a location of a resource at the end of the current DRX cycle, and is about to enter the next DRX cycle, as shown in FIG. 4. If the wake-up message is detected in the target subframe, when the current DRX cycle ends, the terminal can directly enter the continuous active period. The number of target subframes is one or more.

The base station can configure the target resource corresponding to the target subframe in the current DRX cycle for the terminal. The target resource includes but are not limited to time-frequency resource.

At step 204, the target resource is sent to the terminal through preset signaling.

At this step, the base station may configure a target resource for the terminal through preset signaling, for example, RRC signaling.

In the embodiment, the base station can configure the target resource for the terminal, and the terminal determines a target subframe according to the target resource. The terminal only needs to monitor whether the wake-up message is received on the target subframe of the current DRX cycle, which further saves terminal resources and terminal power. When the wake-up message is received, the terminal can enter the continuous active period in a timely manner to continuously receive data.

Figure 9:
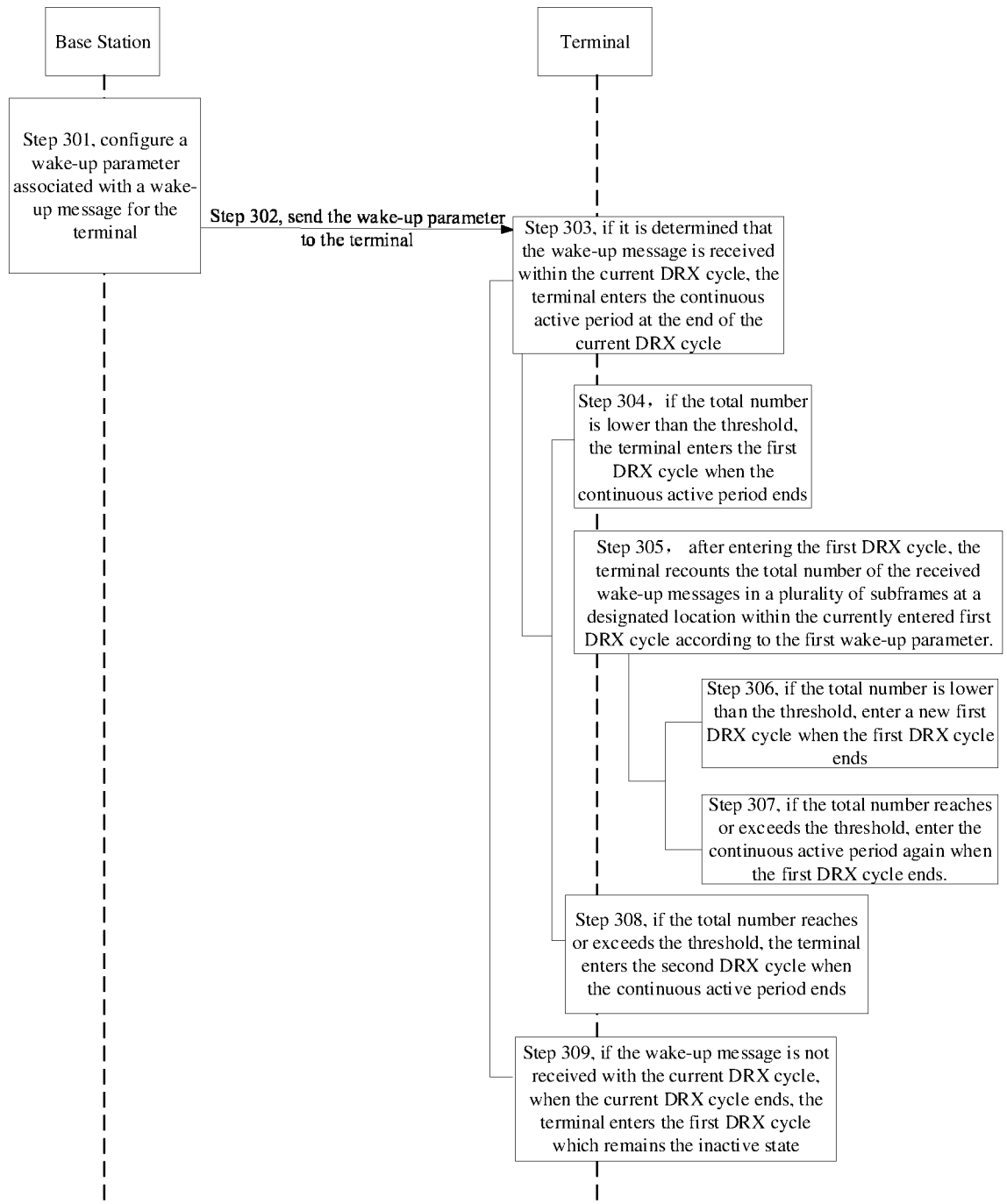
FIG. 9 is a flowchart illustrating a DRX parameter configuration method according to some embodiments.

FIG. 9 is a flowchart of a DRX parameter configuration method according to some embodiments. The method may include the following steps.

At step 301, a wake-up parameter associated with a wake-up message is configured by a base station for the terminal.

The wake-up message is configured to detect whether the wake-up message is received within each DRX cycle, and if it is determined that the wake-up message is received within the current DRX cycle, when the current DRX cycle ends, the terminal is controlled to enter a continuous active period for continuously receiving data; the target DRX cycle is the first DRX cycle or the second DRX cycle, and a cycle duration of the first DRX cycle is longer than a cycle duration of the second DRX cycle.

At step 302, the wake-up parameter is sent by the base station to the terminal.

If the terminal determines that the wake-up message is received within the current DRX cycle, step 303 is performed, otherwise, step 309 is performed.

At step 303, if it is determined that the wake-up message is received within the current DRX cycle, the terminal enters the continuous active period at the end of the current DRX cycle.

If the total number of the wake-up messages received is lower than a threshold, step 304 is performed; otherwise, step 308 is performed.

At step 304, if the total number is lower than the threshold, the terminal enters the first DRX cycle when the continuous active period ends.

At step 305, after entering the first DRX cycle, the terminal recounts the total number of the received wake-up messages in a plurality of subframes at a designated location within the currently entered first DRX cycle according to the first wake-up parameter.

At step 306, if the total number is lower than the threshold, a new first DRX cycle is entered when the first DRX cycle ends.

At step 307, if the total number reaches or exceeds the threshold, the continuous active period is entered again when the first DRX cycle ends.

At step 308, if the total number reaches or exceeds the threshold, the terminal enters the second DRX cycle when the continuous active period ends.

At step 309, if the wake-up message is not detected with the current DRX cycle, when the current DRX cycle ends, the terminal enters the first DRX cycle which remains the sleep state and the sleep state is a state in which the terminal does not monitor a state of the PDCCH.

In the embodiments, the wake-up message is used in the DRX mechanism, so that the terminal can respond faster when there is data to be transmitted, which can better save terminal resources and terminal power when there is no data to be transmitted.

Figure 10A:
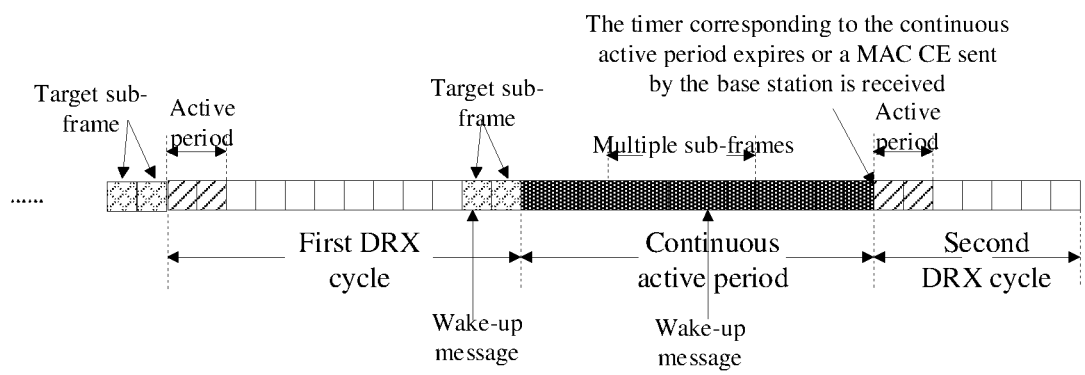
FIGS. 10A and 10B are schematic diagrams illustrating a configuration scenario of a DRX parameter according to some embodiments.
Figure 10B:
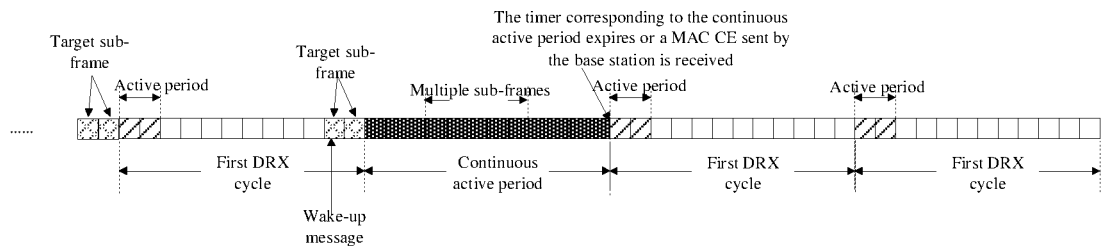

FIGS. 10A and 10B are schematic diagrams illustrating a configuration scenario of a DRX parameter according to some embodiments.

In an example, shown in FIG. 10A, after receiving the target DRX parameter configured by the base station, the terminal detects whether the wake-up message is received on the target subframe within the current DRX cycle. The wake-up message may be a wake-up signal or a wake-up channel. If the wake-up signal is not detected, the first DRX cycle with a longer duration is entered, and the PDCCH blind detection is not performed during the active period of the first DRX cycle.

If the wake-up message is detected by the terminal on the target subframe within the first DRX cycle, the terminal enters the continuous active period when the first DRX cycle ends, thereby continuously receiving data.

The terminal counts the total number of received wake-up messages in a plurality of subframes at designated location within the continuous active period. Assuming that the total number is 1, the threshold is 1, the total number has reached the threshold, and the terminal enters the second DRX cycle with a shorter duration when the continuous active period ends.

In another example, shown in FIG. 10B, after receiving the target DRX parameter configured by the base station, the terminal detects whether a wake-up message is received on the target subframe within the current DRX cycle. The wake-up message may be a wake-up signal or a wake-up channel. If the wake-up signal is not detected, the first DRX cycle with a longer duration is entered.

If the terminal detects the wake-up message on the target subframe within the first DRX cycle, the terminal enters the continuous active period when the first DRX cycle ends, thereby continuously receiving data.

The terminal counts the total number of received wake-up messages in a plurality of subframes at designated location within the continuous active period. Assuming that the total number is 0, the threshold is 1, the total number is less than the threshold, and the terminal enters the first DRX cycle with a longer duration when the continuous active period ends. At the same time, according to the first wake-up parameter, the terminal recounts the total number of the received wake-up messages in a plurality of subframes at a designated location within the currently entered first DRX cycle according to the first wake-up parameter.

If the total number of the wake-up messages received within the first DRX cycle currently entered is 0 and is lower than the threshold 1, the terminal enters a new first DRX cycle when of the current first DRX cycle ends and remains sleep state within the new first DRX cycle, that is, the PDCCH blind detection is not performed during the active period of the first DRX cycle.

If the total number of wake-up messages received within the first DRX cycle currently entered is 1 which reaches the threshold 1, the terminal enters another continuous active period when the current first DRX cycle (not shown in FIG. 10B) ends.

In some embodiments, the involved subframes can also be replaced with symbols, which are not limited in the present disclosure.

Corresponding to the above method embodiments, the present disclosure also provides apparatus embodiments and corresponding base station and terminal.

Figure 11:
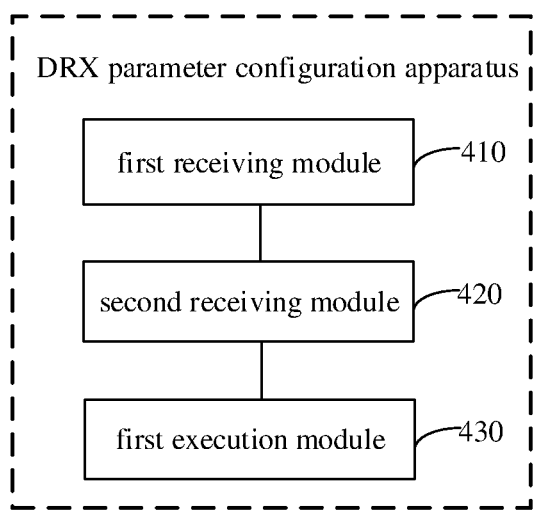
FIG. 11 is a block diagram illustrating a DRX parameter configuration apparatus according to some embodiments.

FIG. 11 is a block diagram illustrating a DRX parameter configuration apparatus according to some embodiments, which is applicable to a terminal. The apparatus includes: a first receiving module 410, a second receiving module 420, and a first execution module 430.

The first receiving module 410 is configured to receive a wake-up parameter associated with a wake-up message configured by a base station for the terminal. The wake-up message is configured to instruct the terminal to detect whether the wake-up message is received within each DRX cycle, and if the wake-up message is detected within a current DRX cycle, when the current DRX cycle ends, enter a continuous active period for continuously receiving data;

The second receiving module 420 is configured to, if the wake-up message is detected within a current DRX cycle, enter a continuous active period for continuously receiving data at an end of the current DRX cycle.

The first execution module 430 is configured to when the continuous active period ends, enter a target DRX cycle according to the wake-up parameter, wherein the target DRX cycle is a first DRX cycle or a second DRX cycle, and a duration of the first DRX cycle is longer than a duration of the second DRX cycle.

In an embodiment, the wake-up parameter includes a first wake-up parameter and a second wake-up parameter. The first wake-up parameter is configured to instruct the terminal to count a total number of wake-up messages received in a plurality of designated time units, and the designated time units include subframes and symbols. The second wake-up parameter is configured to instruct the terminal to determine whether the total number is lower than a predetermined threshold.

Figure 12:
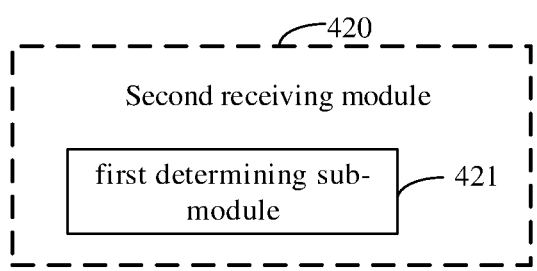
FIG. 12 is a block diagram illustrating a DRX parameter configuration apparatus according to some embodiments.

FIG. 12 is a block diagram illustrating a DRX parameter configuration apparatus according to some embodiments. As shown in FIG. 12, the second receiving module 420 includes: a first determining sub-module 421, configured to, if the wake-up message is received at a target time unit within the current DRX cycle, determine that the wake-up message is received within the current DRX cycle, wherein the target time unit includes a subframe and a symbol.

Figure 13:
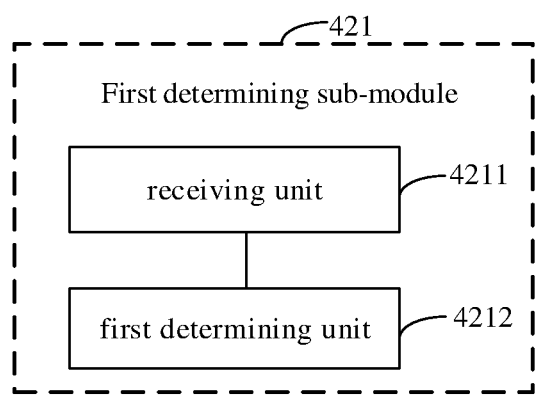
FIG. 13 is a block diagram illustrating a DRX parameter configuration apparatus according to some embodiments.

FIG. 13 is a block diagram illustrating a DRX parameter configuration apparatus according to some embodiments. As shown in FIG. 13, the first determining sub-module 421 includes: a receiving unit 4211, configured to receive a target resource configured by a base station for the terminal through preset signaling, and a first determining unit 4212, configured to use a time unit corresponding to the target source as the target time unit, wherein the time unit includes a subframe and a symbol.

Figure 14:
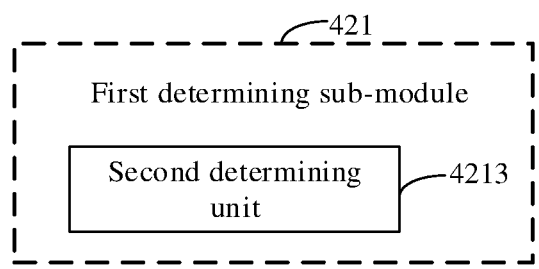
FIG. 14 is a block diagram illustrating a DRX parameter configuration apparatus according to some embodiments.

FIG. 14 is a block diagram illustrating a DRX parameter configuration apparatus according to some embodiments. As shown in FIG. 14, the first determining sub-module 421 includes: a second determining unit 4213 configured to determine the target time unit according to a pre-configuration on the terminal.

Figure 15:
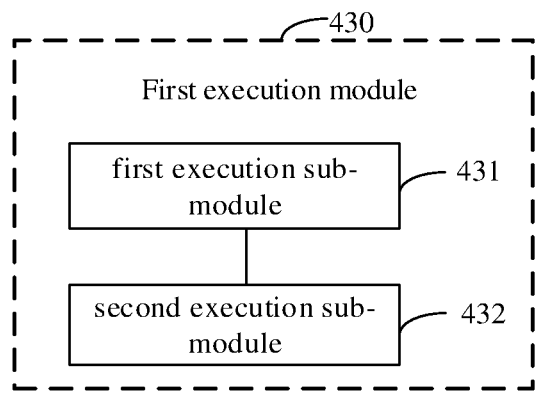
FIG. 15 is a block diagram illustrating a DRX parameter configuration apparatus according to some embodiments.

FIG. 15 is a block diagram illustrating a DRX parameter configuration apparatus according to some embodiments. As shown in FIG. 15, the first execution module 430 includes: a first execution sub-module 431 configured to, if the total number is lower than the threshold, when the continuous active period ends, enter the first DRX cycle; and a second execution sub-module 432 configured to, if the total number reaches or exceeds the threshold, when the continuous active period ends, enter the second DRX cycle.

Figure 16:
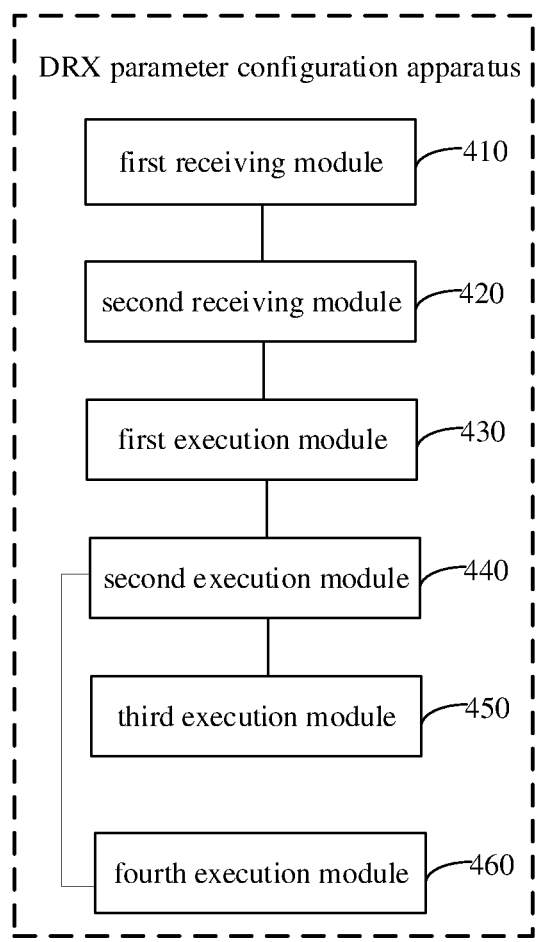
FIG. 16 is a block diagram illustrating a DRX parameter configuration apparatus according to some embodiments.

FIG. 16 is a block diagram illustrating a DRX parameter configuration apparatus according to some embodiments. As shown in FIG. 16, in addition to the modules 410-430 illustrated in FIG. 11, the apparatus further includes: a second execution module 440, a third execution module 450, and a fourth execution module 460. The second execution module 440 is configured to, if the first DRX cycle is entered when the continuous active period ends, recount the total number of received wake-up messages in a plurality of time units at designated locations within a currently entered first DRX cycle according to the first wake-up parameter, wherein the time unit includes a subframe and a symbol. The third execution module 450 is configured to, if the total number is lower than a reference threshold, when the first DRX cycle ends, enter a new first DRX cycle. The fourth execution module 460 is configured to, if the total number reaches or exceeds the reference threshold, when the first DRX cycle ends, re-enter the continuous active period.

Figure 17:
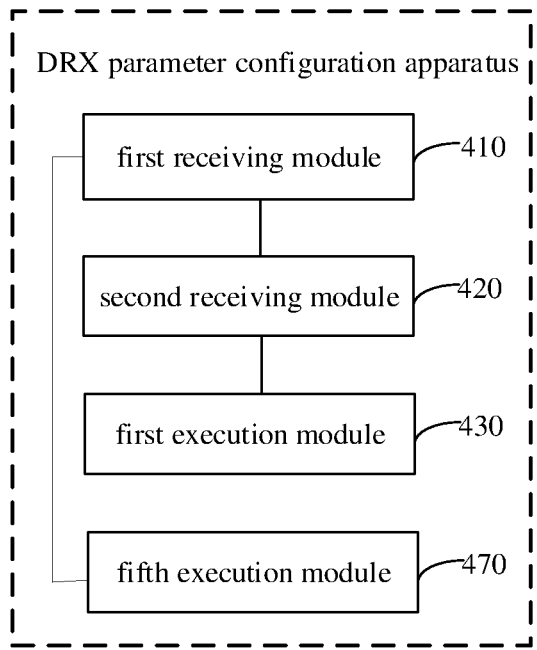
FIG. 17 is a block diagram illustrating a DRX parameter configuration apparatus according to some embodiments.

FIG. 17 is a block diagram illustrating a DRX parameter configuration apparatus according to some embodiments. As shown in FIG. 17, in addition to the modules 410-430 illustrated in FIG. 11, the apparatus further includes: a fifth execution module 470 configured to, if the wake-up message is not received within the current DRX cycle, when the current DRX cycle ends, enter the first DRX cycle which remains a sleep state, and the sleep state is a state in which the terminal does not monitor a state of PDCCH.

Figure 18:
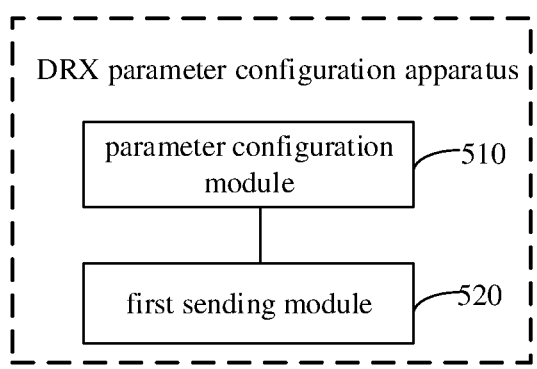
FIG. 18 is a block diagram illustrating a DRX parameter configuration apparatus according to some embodiments.

FIG. 18 is a block diagram illustrating a DRX parameter configuration apparatus according to some embodiments. The apparatus is applicable to a base station and includes: a parameter configuration module 510, configured to configure a wake-up parameter associated with a wake-up message for the terminal; and a first sending module 520, configured to send the wake-up parameter to the terminal.

The wake-up message is configured to instruct the terminal to detect whether the wake-up message is received within each DRX cycle, and in response to that the wake-up message is detected within a current DRX cycle, a continuous active period for continuously receiving data is entered at an end of the current DRX cycle. The wake-up parameter is configured to instruct the terminal to enter a target DRX cycle when the continuous active period ends; the target DRX cycle is a first DRX cycle or a second DRX cycle, and a cycle duration of the first DRX cycle is longer than a cycle duration of the second DRX cycle.

In an embodiment, the wake-up parameter includes a first wake-up parameter and a second wake-up parameter. The first wake-up parameter is configured to instruct the terminal to count a total number of wake-up messages received on a plurality of designated subframes. The second wake-up parameter is configured to instruct the terminal to determine whether the total number is lower than a predetermined threshold.

Figure 19:
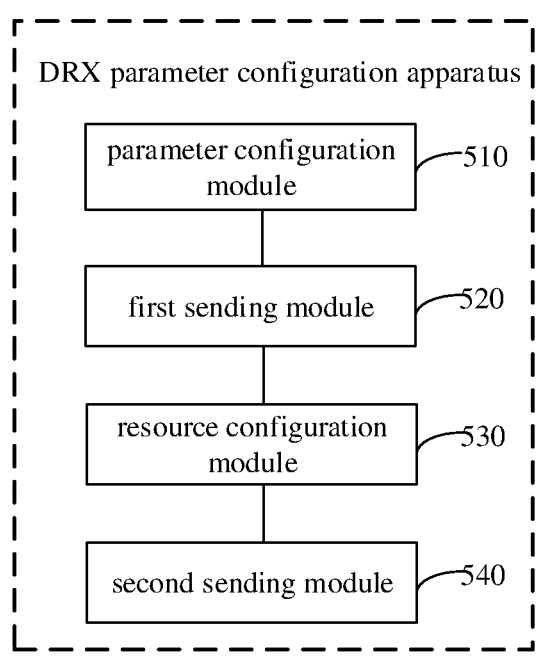
FIG. 19 is a block diagram illustrating a DRX parameter configuration apparatus according to some embodiments.

FIG. 19 is a block diagram illustrating a DRX parameter configuration apparatus according to some embodiments. As shown in FIG. 19, in addition to the modules 510-520 illustrated in FIG. 18, the apparatus further includes: a resource configuration module 530 and a second sending module 540. The resource configuration module 530 is configured to configure a target resource for the terminal; wherein the target resource is a resource corresponding to a target time unit, and the target time unit is a time unit in which the terminal detects whether the wake-up message is received within each DRX cycle, and the time unit includes a subframe and a symbol. The second sending module 540 is configured to send the target resource to the terminal through a preset signaling.

For the apparatus embodiments, since they basically correspond to the method embodiments, reference may be made to the relevant description of the method embodiments. The apparatus embodiments described above are merely exemplary, the modules/units described as separate components may or may not be physically separated, and the components displayed as modules/units may be located in one place or may be distributed to a plurality of networks. Some or all of the modules/units may be selected according to actual needs.

The present disclosure also provides a non-transitory computer-readable storage medium having stored therein instructions that, when executed by a processor of a terminal, cause the terminal to perform the discontinuous reception (DRX) parameter configuration method described above.

The present disclosure also provides a non-transitory computer-readable storage medium having stored therein instructions that, when executed by a processor of a base station, cause the base station to perform the discontinuous reception (DRX) parameter configuration method described above.

The present disclosure also provides a terminal, including: a processor; and a memory storing processor-executable instructions, wherein the processor is configured to: receive a wake-up parameter associated with a wake-up message configured by a base station for the terminal; the wake-up message is configured to instruct the terminal to detect whether the wake-up message is received within each DRX cycle; if it is determined that wake-up message is received within a current DRX cycle, when the current DRX cycle ends, enter a continuous active period for continuously receiving data at the end of the current DRX cycle; and when the continuous active period ends, enter a target DRX cycle according to the wake-up parameter; wherein the target DRX cycle is a first DRX cycle or a second DRX cycle, and a cycle duration of the first DRX cycle is longer than a cycle duration of the second DRX cycle.

Figure 20:
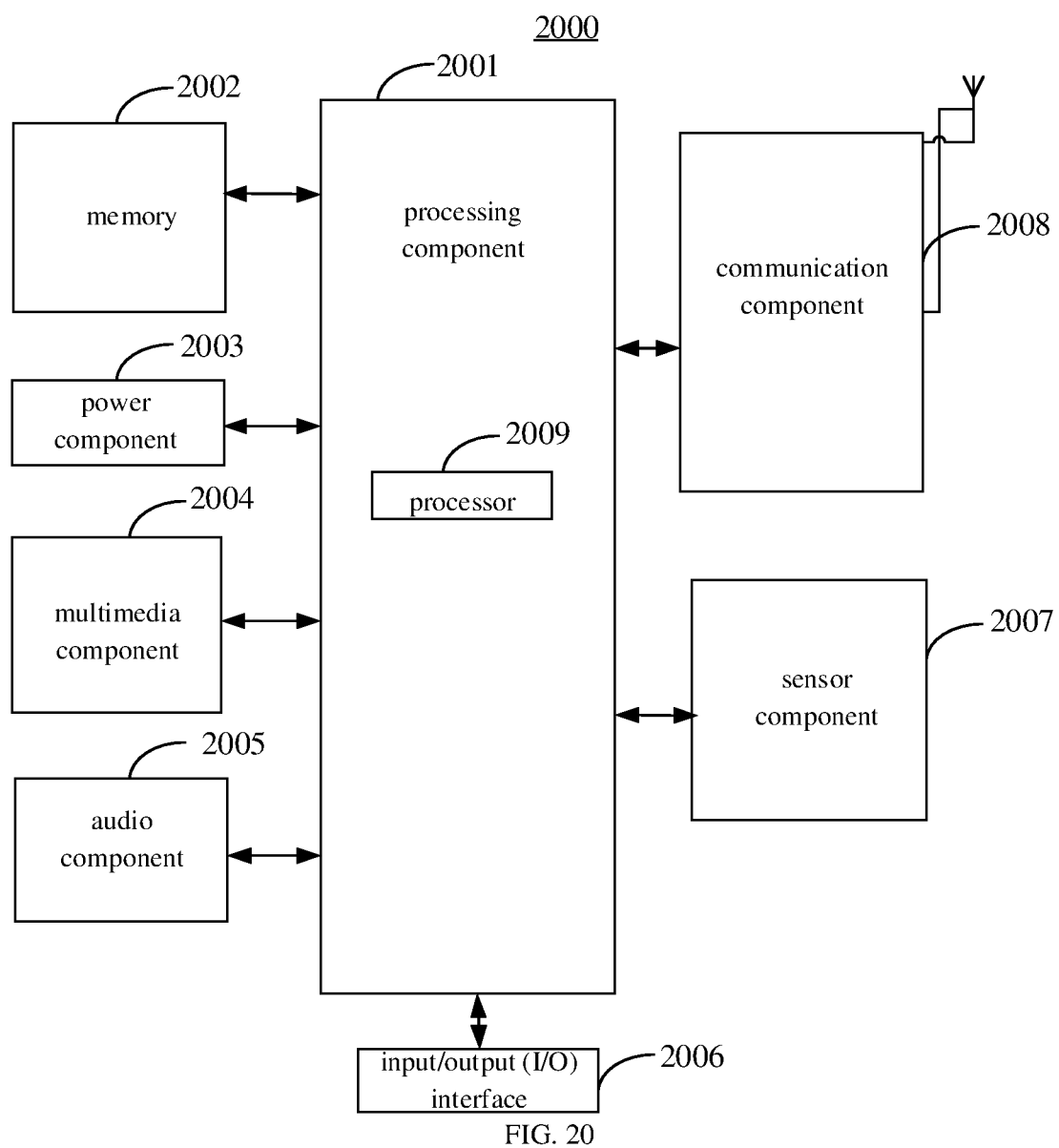
FIG. 20 is a schematic diagram of a DRX parameter configuration device according to some embodiments.

FIG. 20 is a schematic diagram illustrating a discontinuous reception (DRX) parameter configuration device 2000 according to some embodiments. The device 2000 may be a terminal such as a computer, a mobile phone, a digital broadcast terminal, a messaging device, a game console, a tablet device, a medical equipment, a fitness equipment, a personal digital assistant, or other terminals.

Referring to FIG. 20, the device 2000 may include one or more of the following components: a processing component 2001, a memory 2002, a power component 2003, a multimedia component 2004, an audio component 2005, an input/output (I/O) interface 2006, a sensor component 2007, and a communication component 2008.

The processing component 2001 usually controls the overall operation of the device 2000, such as operations associated with display, telephone calls, data communications, camera operations, and recording operations. The processing component 2001 can include one or more processors 2009 to execute instructions to complete all or part of the steps of the above methods. Moreover, the processing component 2001 may include one or more modules to facilitate interaction between the processing component 2001 and other components. For example, the processing component 2001 can include a multimedia module to facilitate the interaction between the multimedia component 2004 and the processing component 2001.

The memory 2002 is configured to store various types of data to support the operation of the device 2000. Examples of these data include instructions for any application or method operating at the user equipment 2000, contact data, phone book data, messages, pictures, videos, and the like. The memory 2002 can be implemented by any type of volatile or non-volatile storage devices or their combination, such as a static random access memory (SRAM), an electrically erasable programmable read-only memory (EE-PROM), erasable Programmable read only memory (EPROM), a programmable read only memory (PROM), a read only memory (ROM), a magnetic memory, a flash memory, a magnetic or optical disk.

The power component 2003 provides power to various components of the device 2000. The power component 2003 may include a power management system, one or more power sources, and other components associated with power generated, managed, and distributed for the device 2000.

The multimedia component 2004 includes a screen providing an output interface between the device 2000 and a user. In some embodiments, the screen may include a liquid crystal display (LCD) and a touch panel (TP). When the screen includes a touch panel, the screen may be implemented as a touch screen to receive input signals from the user. The TP can include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 2004 includes a front camera and/or a rear camera. The front camera and/or rear camera may receive external multimedia data when the device 2000 is in an operating mode, such as a photographing mode or a video mode. Each of the front camera and the rear camera can be a fixed optical lens system or have focal length and optical zooming capability.

The audio component 1616 is configured to output and/or input an audio signal. For example, the audio component 1616 includes a microphone (MIC). When the device 2000 is in an operating mode, such as a call mode, a record mode and a voice recognition mode, the microphone is configured to receive an external audio signal. The received audio signal may be further stored in the memory 2002 or transmitted via the communication component 2608. In some examples, the audio component 1616 further includes a speaker for outputting an audio signal.

The I/O interface 2006 provides an interface between the processing component 2001 and a peripheral interface module which may be a keyboard, a click wheel, a button, or the like. These buttons may include but are not limited to: home button, volume button, start button, and lock button.

The sensor component 2007 includes one or more sensors for providing a status assessment in various aspects to the device 2000. For example, the sensor component 2007 may detect an open/closed state of the device 2000 and a relative positioning of components such as the display and keypad of the device 2000, and the sensor component 2007 can also detect a change in position of the device 2000 or a component of the device 2000, the presence or absence of user contact with the device 2000, orientation or acceleration/deceleration of the device 2000, and temperature change of the device 2000. The sensor assembly 2007 may include a proximity sensor configured to detect presence of nearby objects without physical contact. The sensor component 2007 may further include an optical sensor, such as a CMOS or CCD image sensor, for imaging applications. In some examples, the sensor component 2007 can further include an acceleration sensor, a gyroscope sensor, a magnetic sensor, a pressure sensor, or a temperature sensor.

The communication component 2008 is configured to facilitate wired or wireless communication between the device 2000 and other devices. The device 2000 can access a wireless network based on a communication standard, such as WiFi, 4G or 5G, or a combination thereof. In an example, the communication component 2008 receives a broadcast signal or broadcast related information from an external broadcast management system via broadcast channel. In one or more embodiments, the communication component 2008 also includes a near field communication (NFC) module to facilitate short-range communication. For example, the NFC module may be implemented based on a radio frequency identification (RFID) technology, an infrared data association (IrDA) technology, an ultrawide band (UWB) technology, a Bluetooth (BT) technology, and other technologies.

In an example, the device 2000 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an exemplary embodiment, there is further provided a non-transitory computer-readable storage medium having instructions, such as the memory 2002 having instructions, which can be executed by the processor 2009 of the device 2000 to perform the foregoing methods. For example, the non-transitory computer-readable storage medium can be a ROM, a random access memory (RAM), a CD-ROM, a magnetic tape, a floppy disk, an optical data storage device, or the like.

The present disclosure further provides a base station, including: a processor; and a memory storing processor-executable instructions; wherein the processor is configured to: configure a wake-up parameter associated with a wake-up message for the terminal; and send the wake-up parameter to the terminal. The wake-up message is configured to instruct the terminal to detect whether the wake-up message is received within each DRX cycle and, if the wake-up message is detected within a current DRX cycle, when the current DRX cycle ends, enter a continuous active period for continuously receiving data. The wake-up parameter is configured to instruct the terminal to enter a target DRX cycle when the continuous active period ends; the target DRX cycle is a first DRX cycle or a second DRX cycle, and a duration of the first DRX cycle is longer than a duration of the second DRX cycle.

Figure 21:
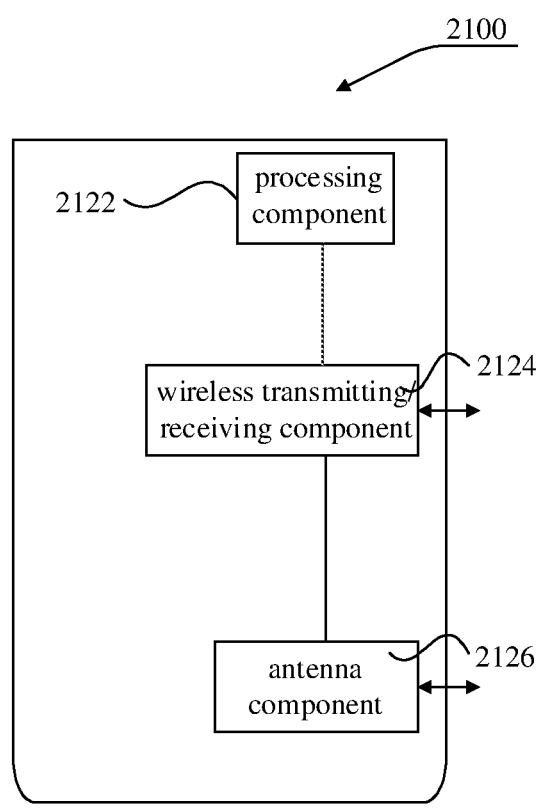
FIG. 21 is a schematic diagram of a DRX parameter configuration device according to some embodiments.

FIG. 21 is a schematic diagram illustrates a discontinuous reception (DRX) parameter configuration device 2100 according to some embodiments. The device 2100 can be a base station. Referring to FIG. 21, the device 2100 includes a processing component 2122, a wireless transmitting/receiving component 2124, an antenna component 2126, and a signal processing portion specific to a wireless interface. The processing component 2122 may further include one or more processors.

One of the processors in the processing component 2122 may be configured to perform any of the discontinuous reception (DRX) parameter configuration methods as described above.

The technical solutions provided by the embodiments of the present disclosure may have the following beneficial effects.

In the embodiments, the terminal may receive a wake-up parameter associated with a wake-up message configured by the base station for the terminal. If the terminal determines that the wake-up message is received with a current DRX cycle, the terminal may enter a continuous active period when the current DRX cycle ends. Further, the target DRX cycle can be entered according to the wake-up parameter when the continuous active period ends. In the embodiments of the present disclosure, wake-up message is introduced to the DRX mechanism, so that the terminal can respond faster when there is data to be transmitted, and it can better save terminal resources and terminal power when there is no data to be transmitted.

In the embodiments, the wake-up parameter may include a first wake-up parameter and a second wake-up parameter, where the first wake-up parameter is configured to instruct the terminal to count a total number of wake-up messages received on multiple designated subframes; the second wake-up parameter may be used to instruct the terminal to determine whether the total number is lower than a predetermined threshold. The terminal can count the total number of received wake-up messages on multiple subframes/symbols at designated locations according to the above two parameters, and determine whether the total number reaches a predetermined threshold, so as to determine whether the terminal needs to enter the first DRX cycle or the second DRX cycle when the continuous active period ends, thereby offering a high availability.

In the embodiments, if the terminal receives the wake-up message at the location of the target subframe in the current DRX cycle, it determines that the wake-up message is received within the current DRX cycle. Optionally, the base station may configure the target resource for the terminal through preset signaling, and the terminal uses the subframe indicated by the target resource as the target subframe. The target subframe can also be determined according to the pre-configuration on the terminal. Through the above process, the terminal only needs to monitor whether the wake-up message is received on the target subframe in the current DRX cycle, which further saves terminal resources and terminal power. At the same time, when the wake-up message is received, it can enter the continuous active period in time to continuously receive data.

In the embodiments, if the total number of wake-up messages received by the terminal is lower than the threshold, when the continuous active period ends, the terminal may enter the first DRX cycle with a longer duration; if the total number of wake-up messages received by the terminal reaches or exceeds the threshold, when the continuous active period ends, the terminal may enter the second DRX cycle with a shorter duration. Through the above process, when the terminal receives less wake-up message, it can enter the first period with a longer period, thereby saving terminal power and terminal resources; when the terminal receives more wake-up information, enter the second period with a shorter period. DRX cycle, in order to respond quickly when there is data to be transmitted.

In the above embodiments, if the terminal enters the first DRX cycle with a longer duration when the continuous active period ends, the terminal can recount the total number of received wake-up messages on the multiple subframes at designated location within the currently entered first DRX cycle according to the first wake-up parameter. In this way, the terminal may enter the first DRX cycle with a long duration, if the total number of wake-up messages received is lower than the preset threshold, the terminal can re-enter a new first DRX cycle when the first DRX cycle ends. If the total number of wake-up messages received reaches or exceeds the threshold, the terminal can quickly enter the continuous active period and receive data in a timely manner.

In the above embodiments, if the terminal does not receive the wake-up message in the current DRX cycle, when the current DRX cycle ends, the terminal can enter the first DRX cycle which remains the sleep state is, and the sleep state is a state in which the terminal does not monitor a state of the PDCCH. Through the above process, when the terminal does not receive the wake-up message in the current DRX cycle, it enters the first DRX cycle with a longer cycle duration, and remain in a long period of sleep state without monitoring PDCCH, thereby saving better terminal resources and terminal power.

In the above embodiments, a wake-up parameter associated with a wake-up message may be configured by a base station for a terminal and the wake-up parameter may be sent to the terminal. The terminal detects whether the wake-up parameter is received within each DRX cycle, if the wake-up parameter is received within the current cycle, enters the continuous active period when the DRX cycle ends. Further, the terminal may enter the target DRX cycle according to the wake-up parameter when the continuous active period ends. In the above embodiments, a wake-up message is introduced to the DRX mechanism. A wake-up parameter associated with the wake-up message is configured by a base station, so that the terminal can respond faster when there is data to be transmitted, which can better save terminal resources and terminal power when there is no data to be transmitted.

After considering the specification and practicing the disclosure disclosed herein, one of ordinary skill in the art will easily conceive of other embodiments of the present disclosure. This disclosure is intended to cover any variations, applications, or adaptive changes of the present disclosure. These variations, applications, or adaptive changes follow the general principles of the present disclosure and include common knowledge or conventional technical means in the art not described in the present disclosure. The description and the embodiments are only exemplary, and the true scope and spirit of the present disclosure are set forth in the appended claims.

It should be understood that the present disclosure is not limited to the exact structure that has been described above and illustrated in the drawings, and various modifications and changes can be made without departing from the scope of the present disclosure. The scope of the present disclosure is only limited by the appended claims.

The invention claimed is:

1. A discontinuous reception (DRX) parameter configuration method, the method applied to a terminal and comprising:
receiving a wake-up parameter associated with a wake-up message configured by a base station for the terminal, wherein the wake-up message is configured to instruct the terminal to detect whether the wake-up message is received within each DRX cycle;
in response to determining that the wake-up message is received within a current DRX cycle, entering a continuous active period at an end of the current DRX cycle; and
when the continuous active period ends, entering a target DRX cycle according to the wake-up parameter, wherein the target DRX cycle is a first DRX cycle or a second DRX cycle, and a cycle duration of the first DRX cycle is longer than a cycle duration of the second DRX cycle;
wherein the wake-up parameter comprises a first wake-up parameter, the first wake-up parameter is configured to instruct the terminal to count a total number of wake-up messages received in a plurality of designated time units, and the designated time units comprise subframes and symbols.

2. The method of claim 1, wherein:
the wake-up parameter further comprises a second wake-up parameter; and
the second wake-up parameter is configured to instruct the terminal to determine whether the total number of wake-up messages is lower than a predetermined threshold.

3. The method of claim 2, wherein determining that the wake-up message is received within the current DRX cycle comprises:
in response to determining that the wake-up message is received at a target time unit within the current DRX cycle, determining that the wake-up message is received within the current DRX cycle, wherein the target time unit comprises a subframe and a symbol.

4. The method of claim 3, wherein the target time unit is determined by:
receiving a target resource configured by the base station for the terminal through preset signaling; and
using a time unit corresponding to the target source as the target time unit, wherein the time unit comprises a subframe and a symbol.

5. The method of claim 3, wherein the target time unit is determined by:
determining the target time unit according to a pre-configuration on the terminal.

6. The method of claim 2, wherein when the continuous active period ends, entering the target DRX cycle according to the wake-up parameter comprises:
in response to determining that the total number of wake-up messages is lower than the threshold, when the continuous active period ends, entering the first DRX cycle; and
in response to determining that the total number of wake-up messages reaches or exceeds the threshold, when the continuous active period ends, entering the second DRX cycle.

7. The method of claim 2, further comprising:
in response to entering the first DRX cycle when the continuous active period ends, recounting a total number of received wake-up messages in a plurality of time units at designated locations within a currently entered first DRX cycle according to the first wake-up parameter, wherein the time unit comprises a subframe and a symbol;
in response to determining that the total number of wake-up messages is lower than a reference threshold, when the first DRX cycle ends, entering a new first DRX cycle; and
in response to determining that the total number of wake-up messages reaches or exceeds the reference threshold, when the first DRX cycle ends, re-entering the continuous active period.

8. The method of claim 1, further comprising:
in response to determining that the wake-up message is not received within the current DRX cycle, when the current DRX cycle ends, entering the first DRX cycle which remains a sleep state, wherein the sleep state is a state in which the terminal does not monitor a physical downlink control channel (PDCCH).

9. A non-transitory computer-readable storage medium having stored therein instructions that, when executed by a processor of a terminal, cause the terminal to perform the discontinuous reception (DRX) parameter configuration method according to claim 1.

10. A discontinuous reception (DRX) parameter configuration method, the method applied to a base station and comprising:
configuring a wake-up parameter associated with a wake-up message for a terminal; and
sending the wake-up parameter to the terminal;
wherein the wake-up message is configured to instruct the terminal to detect whether the wake-up message is received within each DRX cycle, and in response to determining that the wake-up message is received within a current DRX cycle, enter a continuous active period for continuously receiving data at an end of the current DRX cycle; and
wherein the wake-up parameter is configured to instruct the terminal to enter a target DRX cycle when the continuous active period ends, the target DRX cycle is a first DRX cycle or a second DRX cycle, and a cycle duration of the first DRX cycle is longer than a cycle duration of the second DRX cycle; and the wake-up parameter comprises a first wake-up parameter, the first wake-up parameter is configured to instruct the terminal to count a total number of wake-up messages received in a plurality of designated time units, and the designated time units comprise subframes and symbols.

11. The method of claim 10, wherein:

the wake-up parameter further comprises a second wake-up parameter; and the second wake-up parameter is configured to instruct the terminal to determine whether the total number of wake-up messages is lower than a predetermined threshold.

12. The method of claim 11, further comprising:

configuring a target resource for the terminal, wherein the target resource is a resource corresponding to a target time unit, the target time unit is a time unit in which the terminal detects whether the wake-up message is received within each DRX cycle, and the time unit comprises a subframe and a symbol; and sending the target resource to the terminal through preset signaling.

13. A non-transitory computer-readable storage medium having stored therein instructions that, when executed by a processor of a base station, cause the base station to perform the discontinuous reception (DRX) parameter configuration method according to claim 10.

14. A base station, comprising:

a processor; and a memory storing instructions executable by the processor;

wherein the processor is configured to perform the discontinuous reception (DRX) parameter configuration method according to claim 10.

15. A terminal, comprising:

a processor; and a memory storing instructions executable by the processor;

wherein the processor is configured to:

receive a wake-up parameter associated with a wake-up message configured by a base station for the terminal, wherein the wake-up message is configured to instruct the terminal to detect whether the wake-up message is received within each discontinuous reception (DRX) cycle;

in response to determining that the wake-up message is received within a current DRX cycle, enter a continuous active period at an end of the current DRX cycle; and when the continuous active period ends, enter a target DRX cycle according to the wake-up parameter, wherein the target DRX cycle is a first DRX cycle or a second DRX cycle, and a cycle duration of the first DRX cycle is longer than a cycle duration of the second DRX cycle;

wherein the wake-up parameter comprises a first wake-up parameter, the first wake-up parameter is configured to instruct the terminal to count a total number of wake-up messages received in a plurality of designated time units, and the designated time units comprise subframes and symbols.

* * * * *